United States Patent
Wang et al.

(10) Patent No.: US 7,027,112 B2
(45) Date of Patent: Apr. 11, 2006

(54) LIQUID CRYSTAL DISPLAYS

(75) Inventors: Hai-Lin Wang, Dasi (TW); Te-Hen Lo, Yingge (TW)

(73) Assignee: Au Optronics Corp., Hsinchu (TW)

( * ) Notice: Subject to any disclaimer, the term of this patent is extended or adjusted under 35 U.S.C. 154(b) by 109 days.

(21) Appl. No.: 10/887,715

(22) Filed: Jul. 9, 2004

(65) Prior Publication Data

US 2005/0146660 A1 Jul. 7, 2005

(30) Foreign Application Priority Data

Jan. 7, 2004 (TW) .............................. 93100325 A

(51) Int. Cl.
  *G02F 1/13* (2006.01)
(52) U.S. Cl. ....................................... 349/58
(58) Field of Classification Search ................... 349/58
  See application file for complete search history.

(56) References Cited

U.S. PATENT DOCUMENTS

| 5,659,376 | A * | 8/1997 | Uehara et al. ................. 349/58 |
| 6,177,971 | B1 * | 1/2001 | Jung et al. ..................... 349/58 |
| 6,246,459 | B1 * | 6/2001 | Simhambhatla et al. ...... 349/58 |
| 6,388,722 | B1 * | 5/2002 | Yoshii et al. .................. 349/58 |
| 6,530,665 | B1 * | 3/2003 | Takizawa et al. ............. 349/58 |
| 6,532,152 | B1 * | 3/2003 | White et al. ................... 349/58 |
| 2003/0174260 | A1 * | 9/2003 | Labrousse et al. ............ 349/58 |
| 2004/0004680 | A1 * | 1/2004 | Kim ............................. 349/58 |
| 2004/0141101 | A1 * | 7/2004 | Osu et al. ...................... 349/58 |

FOREIGN PATENT DOCUMENTS

JP  2004-133101  4/2004

* cited by examiner

*Primary Examiner*—James A. Dudek
(74) *Attorney, Agent, or Firm*—Thomas, Kayden, Horstemeyer & Risley

(57) ABSTRACT

A liquid crystal display. The liquid crystal display comprises a liquid crystal panel, a backlight module, a bezel and a light-inductive adhesive layer. The backlight module and the bezel are disposed respectively on the two surfaces of the liquid crystal panel so that the liquid crystal panel and the backlight module are enclosed by the bezel. The light-inductive adhesive layer is disposed between the liquid crystal panel and the bezel to adhere the bezel to the liquid crystal panel. When light of a specific wavelength irradiates the light-inductive adhesive layer, the light-inductive adhesive layer loses adhesion, enabling separation of the liquid crystal panel and the bezel.

11 Claims, 6 Drawing Sheets

LIQUID CRYSTAL DISPLAYS

BACKGROUND

The present invention relates to liquid crystal displays (LCDs), and particularly to LCDs comprising light-inductive materials.

Generally, an LCD comprises a liquid crystal panel and a backlight module. The liquid crystal panel is the display of the LCD. Since the liquid crystal panel does not emit light, a light source providing sufficient brightness and uniform distribution is required to properly display images. A backlight module serves as the light source for the LCD. Further, a "bezel," i.e. a frame, encloses and protects the backlight module and the liquid crystal panel.

Generally, backlight modules can be categorized as direct and edge structures. In edge backlight modules, the light source is disposed on a side of the backlight module to reduce volume thereof, and a light guide plate guides the light toward the liquid crystal panel. In direct backlight modules the light source is disposed directly in the cavity of the backlight module, thus occupying a relatively larger volume thereof. However, more than one lamp can be employed to enhance light emission, and provide more uniform light distribution.

FIG. 1 is a perspective view showing a conventional LCD. In FIG. 1, the LCD comprises a liquid crystal panel 100, a backlight module 110, and a bezel 120. The backlight module 110 can be either direct or edge type, and the detailed structure of the backlight module 110 is not illustrated. The bezel 120 surrounds the liquid crystal panel 100 and comprises an opening 125, through which the liquid crystal panel 100 is viewed. In FIG. 1, the backlight module 110 is disposed at the bottom of the liquid crystal panel 100, and the bezel 120 surrounds the liquid crystal panel 100 and the backlight module 110.

Since the liquid crystal panel 100 comprises glass, fractures or cracks may occur upon impact or due to shock. In practice, various protective structures are employed to prevent damage to the liquid crystal panel 100.

FIG. 2a shows a conventional protective structure of the liquid crystal panel 100 in the LCD. In FIG. 2a, a gap 130 exists between the liquid crystal panel 100 and the bezel 120, and a plurality of cushioning pads 150 are disposed in the gap 130. Thus, the liquid crystal panel 100 and the bezel 120 are fixed together with the cushioning pads 150. The cushioning pads 150 generally comprise rubber, plastic, or other material with high elasticity. When the liquid crystal display is impacted, the cushioning pads 150 absorb the shock preventing damage to the liquid crystal panel 100.

In order to accommodate placement of cushioning pads 150, the size of the bezel 120 typically is increased to obtain a suitably sized gap 130. Since the cushioning pads 150 occupy a certain portion of the overall volume of the liquid crystal display for effective shock absorption, increased bezel size is critical, thus hindering portability.

FIG. 2b shows another conventional protective structure of the liquid crystal panel 100 in the LCD. In FIG. 2b, the liquid crystal panel 100 and the bezel 120 are adhered at the overlapping area 160 with an adhesive layer such as tape. When impact occurs, the bezel 120 absorbs a large portion of the shock, thus reducing impact on the liquid crystal panel 100. Further, the width of the gap 130 can be reduced due to elimination of the cushioning pads. Thus, the overall volume of the LCD can be reduced, enhancing portability thereof.

Since the bezel 120 and the liquid crystal panel 100 are firmly adhered, however, it is difficult to detach the bezel 120 from liquid crystal panel 100 for assembly rework or maintenance. Further, it is possible that the bezel 120 and the liquid crystal panel 100 may be damaged during disassembly.

SUMMARY

An embodiment of an LCD comprises a liquid crystal panel having two surfaces, a backlight module, a bezel, and a light-inductive adhesive layer. The backlight module and the bezel are disposed respectively on the two surfaces of the liquid crystal panel so that the liquid crystal panel and the backlight module are enclosed by the bezel. The light-inductive adhesive layer is disposed between the liquid crystal panel and the bezel to adhere the bezel and the liquid crystal panel. When light of a specific wavelength is provided irradiating the light-inductive adhesive layer, the adhesive strength is reduced enabling easy separation of the liquid crystal panel and the bezel.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3b is an exploded view of the LCD of FIG. 3a;

FIG. 3c is a bottom view of the LCD of FIG. 3a;

FIG. 3d is a cross-section of the LCD of FIG. 3a; and

DETAILED DESCRIPTION

In some embodiments, liquid crystal displays are provided in which light-inductive adhesive layers are used as the protection structures of the liquid crystal panels. Thus, the liquid crystal panels and the bezels can be easily separated when required by exposing the LCDs to light of specific wavelengths.

An embodiment of a liquid crystal display is described hereinafter with reference to FIGS. 3a to 3d.

Figure 1:
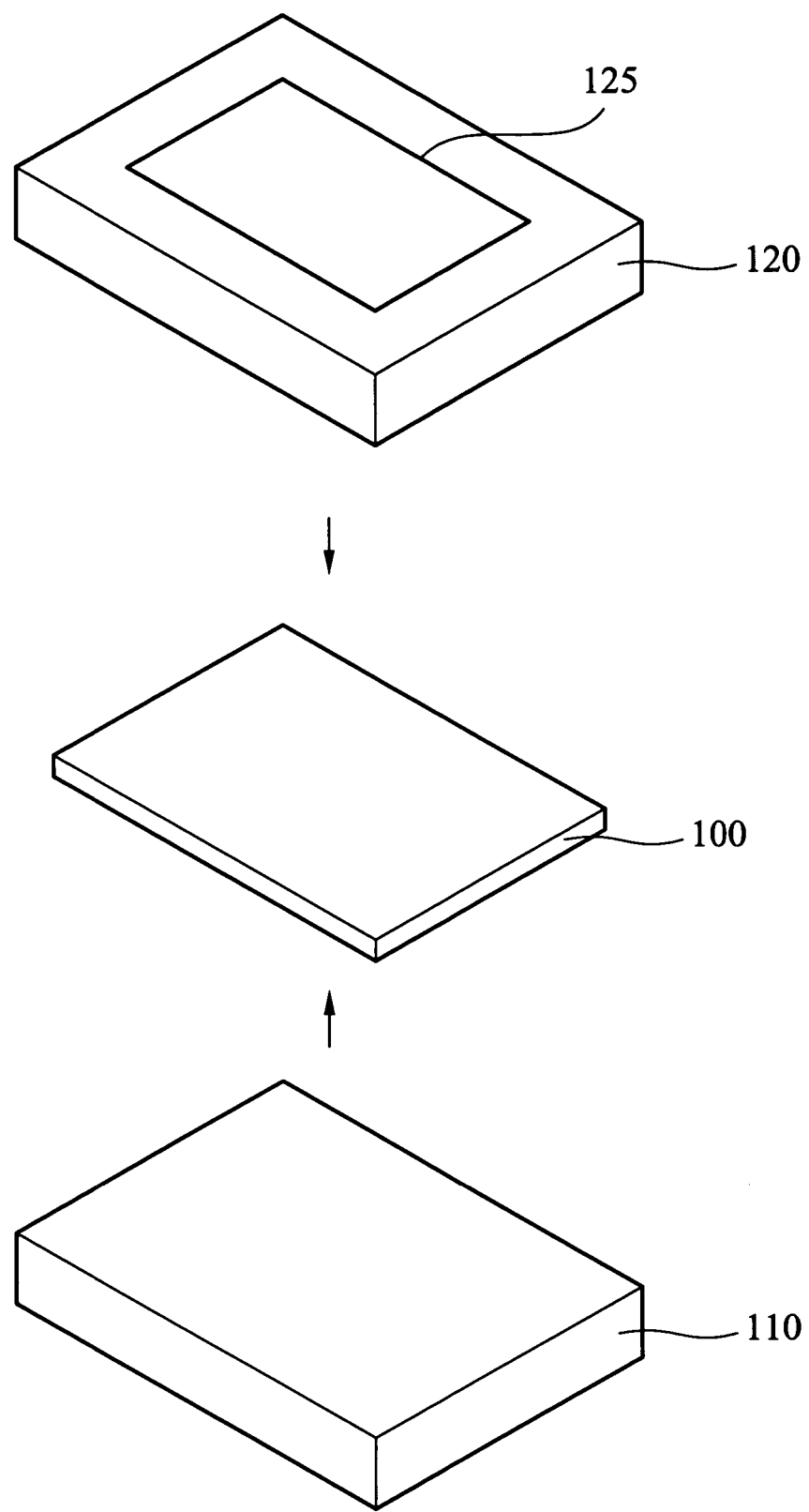
FIG. 1 is a schematic view of a conventional LCD.
Figure 2A:
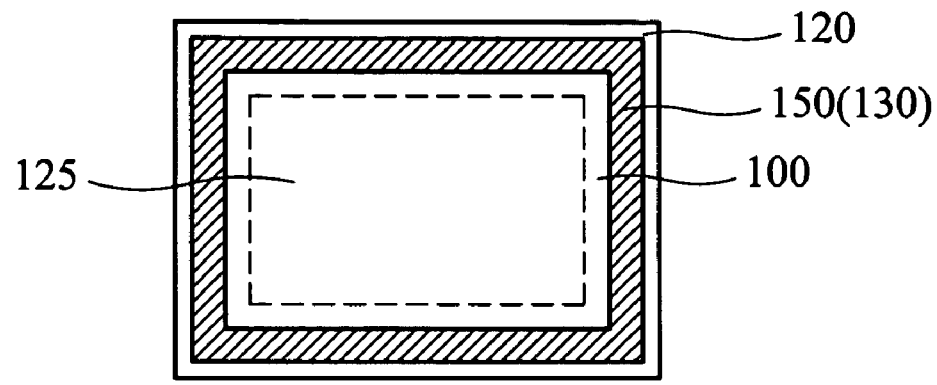
FIG. 2a is a bottom view of the conventional LCD employing cushioning pads in the protective structure of the liquid crystal panel.
Figure 2B:
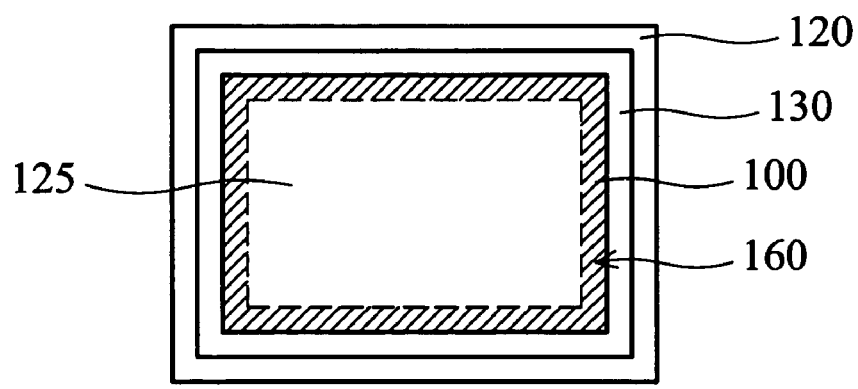
FIG. 2b is a bottom view of the conventional LCD employing an adhesive layer in the protective structure of the liquid crystal panel.
Figure 3A:
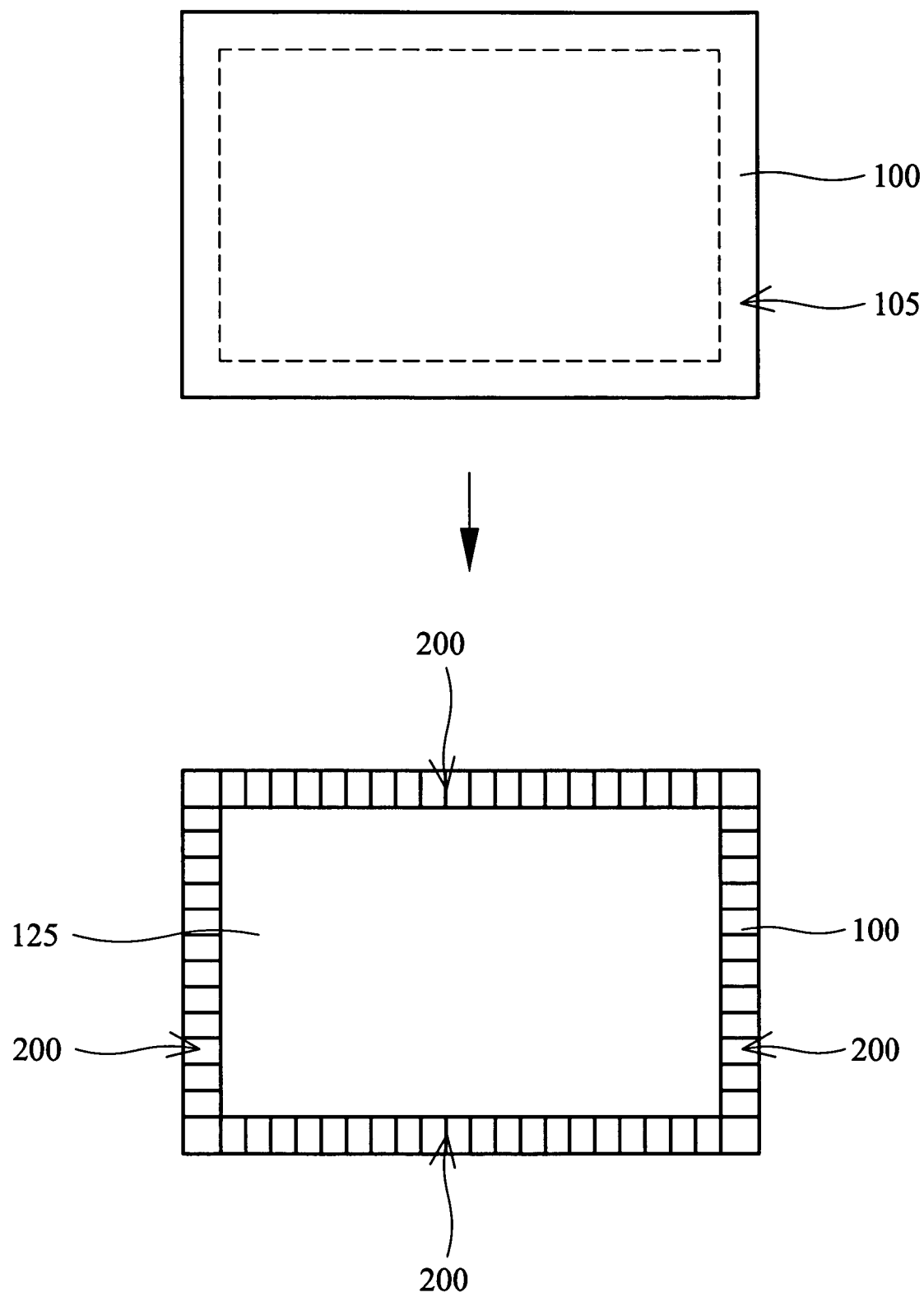
FIG. 3a is a schematic view of an embodiment of a liquid crystal panel.

As shown in FIGS. 3a to 3d, the liquid crystal display comprises a liquid crystal panel 100, a backlight module 110, a bezel 120 and a light-inductive adhesive layer 200. FIG. 3a shows the liquid crystal panel 100 and the light-inductive adhesive layer 200. The liquid crystal panel 100 has an overlapping area 105 for application of the light-inductive adhesive layer 200. In some embodiments, the light-inductive adhesive layer 200 can be an ultraviolet inductive adhesive tape or ultraviolet inductive adhesive for adhering the liquid crystal panel 100 to the bezel 120. When light of a specific wavelength, such as ultraviolet light, irradiates the light-inductive adhesive layer 200, the adhesive strength is reduced, enabling simplified separation of the liquid crystal panel 100 and the bezel 200.

Figure 3B:
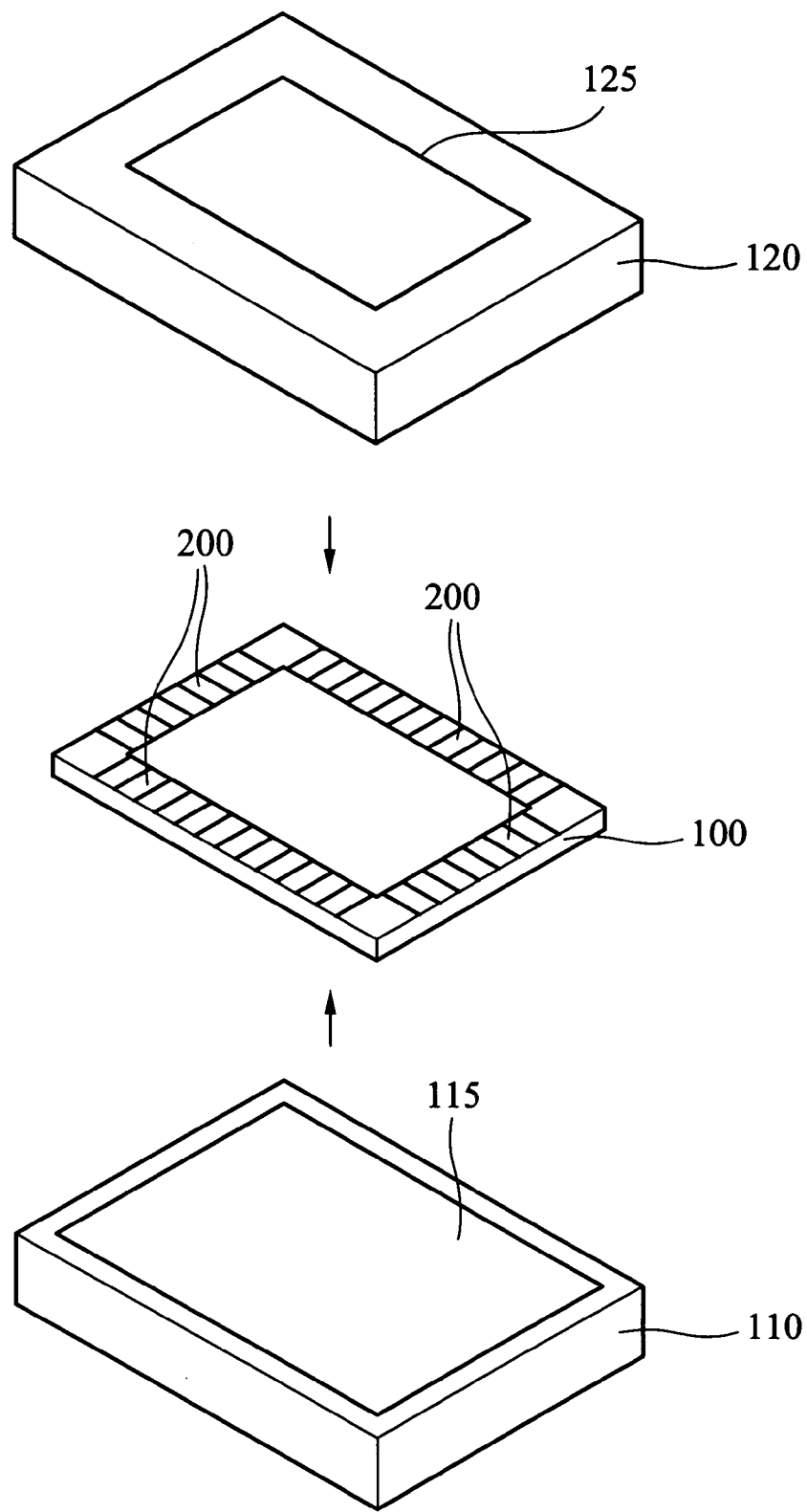

FIG. 3b shows an exploded view of the embodiment of the LCD of FIG. 3a. The light-inductive adhesive layer 200 is attached to the liquid crystal panel 100 as shown in FIG. 3a. In some embodiments, the backlight module 110 can be a direct type, whereas, in other embodiments, the backlight module can be an edge type. The optical films and elements of the backlight module 110 are typically capable of inducting ultraviolet light. To protect the optical films and elements of the backlight module 110, an ultraviolet resist layer 115 can be provided on the backlight module 110. The ultraviolet resist layer 115 can be opaque to ultraviolet light but pervious to visible light, allowing visible light from the backlight module 110 to pass therethrough. Further, the bezel 120 comprises an opening 125, through which the liquid crystal panel 100 is viewed.

As shown in FIG. 3b, the backlight module 110 is disposed at the bottom of the liquid crystal panel 100, and the bezel 120 surrounds the liquid crystal panel 100, and the backlight module 110 thereby encasing the LCD. The LCD is illustrated in detail in FIG. 3c and FIG. 3d.

Figure 3C:
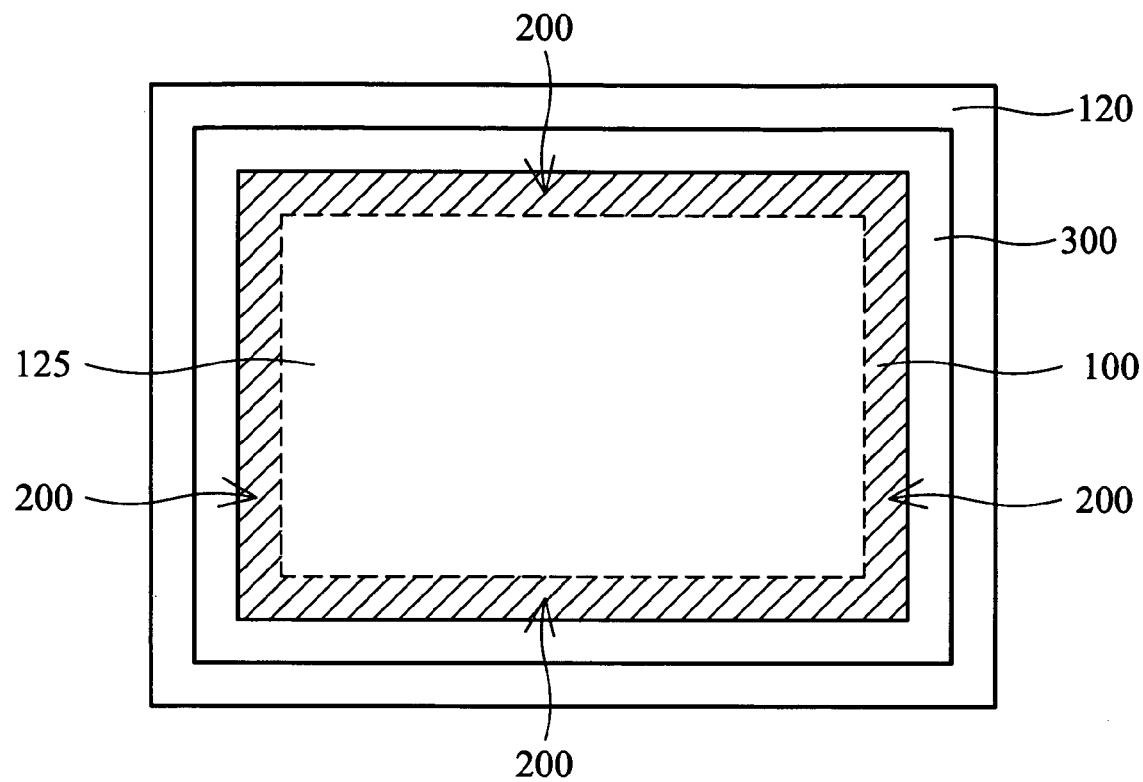
Figure 3D:
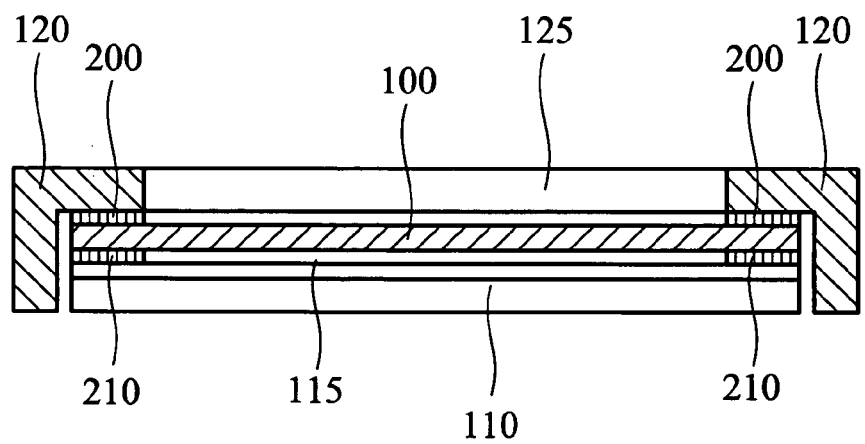

As shown in the bottom view of FIG. 3c, the light-inductive adhesive layer 200 is attached to the overlapping area of the liquid crystal panel 100 and the bezel 120. Thus, the liquid crystal panel 100 and the bezel 120 are firmly adhered. Further, in some embodiments, a liquid crystal panel and the backlight module can be adhered with another light-inductive adhesive layer 210, such as shown in the cross-sectional side view of FIG. 3d. Specifically, the light-inductive adhesive layer 200 between the liquid crystal panel 100 and the bezel 120 can be a first ultraviolet inductive adhesive layer, and the light-inductive adhesive layer 210 between the liquid crystal panel 100 and the backlight module 120 can be a second ultraviolet inductive adhesive layer. Either of the first and second ultraviolet inductive adhesive layers 200 and 210 can be an ultraviolet inductive adhesive tape or an ultraviolet inductive adhesive. Thus, when such an LCD is assembled, the light-inductive adhesive layers 200 and 210 firmly adhere the bezel 120 and the backlight module 110 to the liquid crystal panel 100.

Figure 4:
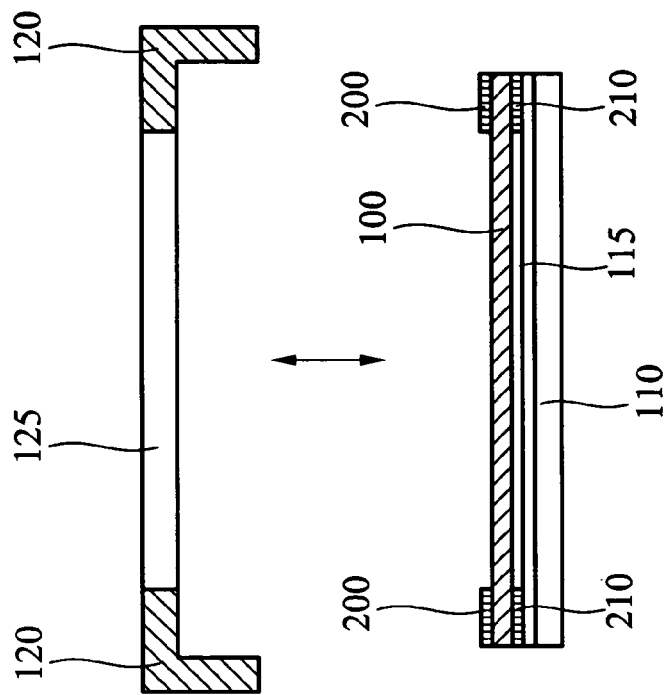
FIG. 4 is a schematic view of the LCD of FIG. 3a, illustrating the LCD being exposed to ultraviolet light.
Figure 4:
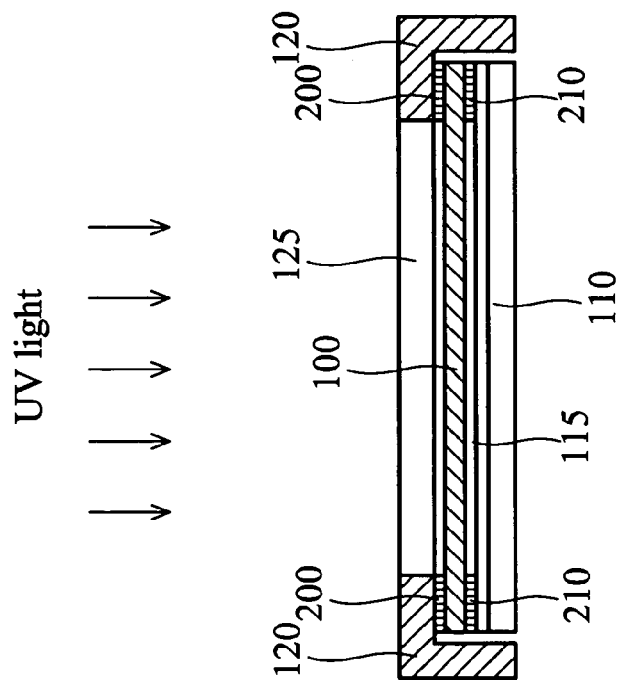

Conversely, when such an LCD is disassembled for rework or maintenance, light of a specific wavelength, e.g. ultraviolet light, irradiates the LCD as shown in FIG. 4. Thus, the light-inductive adhesive layers 200 and 210 are irradiated by UV light, and the adhesive strength is reduced, enabling simplified separation of the liquid crystal panel 100, the bezel 120 and the backlight module 110. Since the light-inductive adhesive layers 200 and 210 lose adhesion, the adhesive layers typically can be removed from the liquid crystal panel 100 without leaving adhesive marks.

It should be noted that the embodiment of the backlight module 110 in FIG. 4 comprises the ultraviolet resist layer 115, which is opaque to ultraviolet light. Thus, when the LCD is irradiated by UV light, the optical films and elements in the backlight module 110 are not exposed.

The present invention can be applied in practice to various backlight module structures. Potentially, the overall volume of an LCD can be reduced, enhancing portability thereof. Meanwhile, the liquid crystal panel and the bezel of such an LCD can be securely adhered together and, thereafter, separated by light irradiation, thereby simplifying disassembly of the LCD for rework or maintenance.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display, comprising:
   a liquid crystal panel comprising two surfaces;
   a backlight module positioned at a first of the surfaces of the liquid crystal panel;
   a bezel disposed at a second of the surfaces of the liquid crystal panel, enclosing the liquid crystal panel and the backlight module; and
   a light-inductive adhesive layer disposed between and adhering the liquid crystal panel and the bezel, wherein, when the light-inductive adhesive layer is irradiated by light of a specific wavelength, adhesion thereof is reduced, enabling separation of the liquid crystal panel and the bezel.

2. The liquid crystal display as claimed in claim 1, wherein the specific wavelength of the light is ultraviolet.

3. The liquid crystal display as claimed in claim 2, wherein the backlight module comprises an ultraviolet resist layer pervious to visible light and opaque to ultraviolet light.

4. The liquid crystal display as claimed in claim 1, wherein the light-inductive adhesive layer comprises an ultraviolet inductive adhesive tape.

5. The liquid crystal display as claimed in claim 1, wherein the backlight module is an edge type backlight module.

6. The liquid crystal display as claimed in claim 1, wherein the backlight module is a direct type backlight module.

7. The liquid crystal display as claimed in claim 1, wherein the backlight module is adhered to the liquid crystal panel with another light-inductive adhesive layer.

8. A liquid crystal display, comprising:
   a liquid crystal panel comprising two surfaces;
   a backlight module positioned at a first of the surfaces of the liquid crystal panel, the backlight module comprising an ultraviolet resisting layer pervious to visible light and opaque to ultraviolet light;
   a bezel disposed at a second of the surfaces of the liquid crystal panel, enclosing the liquid crystal panel and the backlight module;
   a first ultraviolet inductive adhesive layer disposed between the liquid crystal panel and the bezel to adhere the bezel to the liquid crystal panel; and
   a second ultraviolet inductive adhesive layer disposed between the liquid crystal panel and the backlight module to adhere the backlight module to the liquid crystal panel;
   wherein, when the first ultraviolet inductive adhesive layer and the second ultraviolet inductive adhesive layer are irradiate by ultraviolet light, adhesion thereof is reduced, enabling separation of the liquid crystal panel, the bezel and the backlight module.

9. The liquid crystal display as claimed in claim 8, wherein the first ultraviolet inductive adhesive layer and the second ultraviolet inductive adhesive layer respectively comprise an ultraviolet inductive adhesive tape.

10. The liquid crystal display as claimed in claim 8, wherein the backlight module is an edge type backlight module.

11. The liquid crystal display as claimed in claim 8, wherein the backlight module is a direct backlight module.

* * * * *